US008471691B2

(12) United States Patent
Zhang et al.

(10) Patent No.: US 8,471,691 B2
(45) Date of Patent: Jun. 25, 2013

(54) PORTABLE VISION SYSTEM

(75) Inventors: Wende Zhang, Shelby Township, MI (US); Sanjeev M. Naik, Troy, MI (US); Cem U. Saraydar, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 488 days.

(21) Appl. No.: 12/816,070

(22) Filed: Jun. 15, 2010

(65) Prior Publication Data

US 2011/0304444 A1    Dec. 15, 2011

(51) Int. Cl.
*B60Q 1/00* (2006.01)
*G05D 1/00* (2006.01)

(52) U.S. Cl.
USPC ............................. 340/425.5; 340/438; 701/1

(58) Field of Classification Search
USPC .. 340/438, 425.5; 700/90–306; 709/201–203; 701/1
See application file for complete search history.

(56) References Cited

U.S. PATENT DOCUMENTS

| | | | |
|---|---|---|---|
| 6,427,959 B1 * | 8/2002 | Kalis et al. | 248/288.11 |
| 7,174,153 B2 * | 2/2007 | Ehlers | 455/404.2 |
| 2003/0125854 A1 * | 7/2003 | Kawasaki et al. | 701/35 |
| 2005/0146458 A1 * | 7/2005 | Carmichael et al. | 342/52 |
| 2008/0055411 A1 * | 3/2008 | Lee | 348/148 |
| 2008/0177461 A1 * | 7/2008 | Blackwood | 701/200 |
| 2009/0265633 A1 * | 10/2009 | Lim et al. | 715/733 |
| 2010/0322534 A1 * | 12/2010 | Bolme et al. | 382/278 |
| 2011/0169626 A1 * | 7/2011 | Sun et al. | 340/439 |
| 2011/0304444 A1 * | 12/2011 | Zhang et al. | 340/425.5 |

OTHER PUBLICATIONS

John Herrman, "Wikitude Drive Android App Does Turn-By-Turn, Augmented-Reality-Style", Aug. 31, 2009, http://gizmodo.com/5349515/wikitude-drive-android-app-does-turn+by+turn-augmented+reality+style.

Feixiang Ren, Jinsheng Huang, Ruyi Jiang, and Reinhard Klette, "Lane Detection on the iPhone", Multimedia Imaging Report 30, 2008, http://www.mi.auckland.ac.nz/tech-reports/MItech-TR-43.pdf.

* cited by examiner

*Primary Examiner* — Daniel Wu
*Assistant Examiner* — Kam Ma
(74) *Attorney, Agent, or Firm* — John A. Miller; Miller IP Group, PLC

(57) ABSTRACT

A method and system for integrating a camera-equipped handheld mobile device with a vehicle's electronic systems, such that the imaging capabilities of the mobile device can be utilized by the vehicle, and information from vehicle's systems can be utilized by the mobile device. The mobile device is placed in a mounting fixture, which can provide power to the mobile device, and is designed to dynamically aim the mobile device's camera based on driving conditions. The mobile device can communicate with the vehicle's systems wirelessly, or via a wired connection. Images from the mobile device's camera are provided to a processor onboard the vehicle, and can be used by vehicle safety and convenience systems. The mobile device can also receive information from the vehicle and use the information in applications on the mobile device. Computing workload can be shared between the vehicle's processor and the mobile device.

16 Claims, 3 Drawing Sheets

US 8,471,691 B2

PORTABLE VISION SYSTEM

BACKGROUND OF THE INVENTION

1. Field of the Invention

This invention relates generally to vehicle electronics systems and, more particularly, to the integration of a camera-equipped handheld mobile device with a vehicle's electronic systems, such that the imaging capabilities of the mobile device can be utilized by the vehicle, and vehicle dynamics and other information from the vehicle's systems can be utilized by the mobile device.

2. Discussion of the Related Art

Many modern vehicles include sophisticated electronic systems, including safety, navigation, communication, information, and entertainment systems. The cost of the processing units which host these systems has dropped dramatically, and the application software itself can be included on many of a vehicle manufacturer's models at little additional cost once the application is developed. However, in order to keep vehicle cost down, a manufacturer may not include a camera on lower-cost vehicle models. Or, some vehicle models may have only a rear-view camera, used by a backup assistance system, but not a forward-looking camera for other applications. And some of the aforementioned vehicle systems cannot perform all of their functions without image input from a camera, or could provide more features or functions with image input from an additional camera.

At the same time, personal mobile electronic devices equipped with cameras have become very commonplace. These devices include ordinary cell phones, most new models of which include a camera, as well as more sophisticated personal productivity devices which may feature hundreds of applications, such as navigation and augmented reality applications, in addition to camera and cell phone capabilities. Most camera-equipped mobile devices include both video and still-frame image capture capability. Because the life cycle of mobile electronic devices is much shorter than the life cycle of vehicles, and the cost of mobile electronic devices is much lower than the cost of vehicles, many people have more advanced imaging capability in their phone or mobile device than they have in their vehicle.

There is an opportunity to take advantage of the latent capabilities which exist in many peoples' mobile electronic devices by integrating them with a vehicle's electronic systems. This integration would provide vehicle operators with the best capabilities of both the mobile device and the vehicle, while allowing customers to leverage their investment in the latest mobile device technology by using the mobile device in the vehicle.

SUMMARY OF THE INVENTION

In accordance with the teachings of the present invention, a method and system are disclosed for integrating a camera-equipped handheld mobile device with a vehicle's electronic systems, such that the imaging capabilities of the mobile device can be utilized by the vehicle, and information from vehicle's systems can be utilized by the mobile device. The mobile device is placed in a mounting fixture, preferably on the dash of the vehicle. The mounting fixture can provide power to the mobile device, and can be designed to dynamically aim the mobile device's camera based on driving conditions. The mobile device can communicate with the vehicle's onboard systems either wirelessly, or via a wired connection provided through the mounting fixture. Video and/or still images from the mobile device's camera are provided to a processor onboard the vehicle, and these images can be used by the vehicle either to supplement images from an onboard vehicle camera, or in lieu of having an onboard vehicle camera. The mobile device can also receive information, such as vehicle dynamics data, from the vehicle, and use the information in applications on the mobile device. Computing workload can be shared between the processor onboard the vehicle and the processor in the mobile device.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method and system for integrating a camera-equipped handheld mobile device with a vehicle's electronic systems is merely exemplary in nature, and is in no way intended to limit the invention or its applications or uses.

Many systems have been developed for vehicles which provide enhanced safety or convenience for the driver by using image input from an onboard camera. In fact, many vehicles now include systems which require input from two or more cameras in order to operate. For example, a forward-looking camera can be used for collision avoidance and lane departure warning, a rearward-looking camera can be used for backup assistance, and a driver-focused camera can be used for driver attentiveness monitoring. These systems, once developed, could be deployed across many of a vehicle manufacturer's models at little incremental cost, except for the cost of the cameras. As a result, many vehicle models, especially lower cost models, do not include the cameras needed to support some of the existing safety and convenience systems. The embodiments of the present invention address this situation by integrating a camera-equipped mobile device with a vehicle's electronic systems, thus allowing images from the mobile device to be used by the vehicle's systems.

Figure 1:
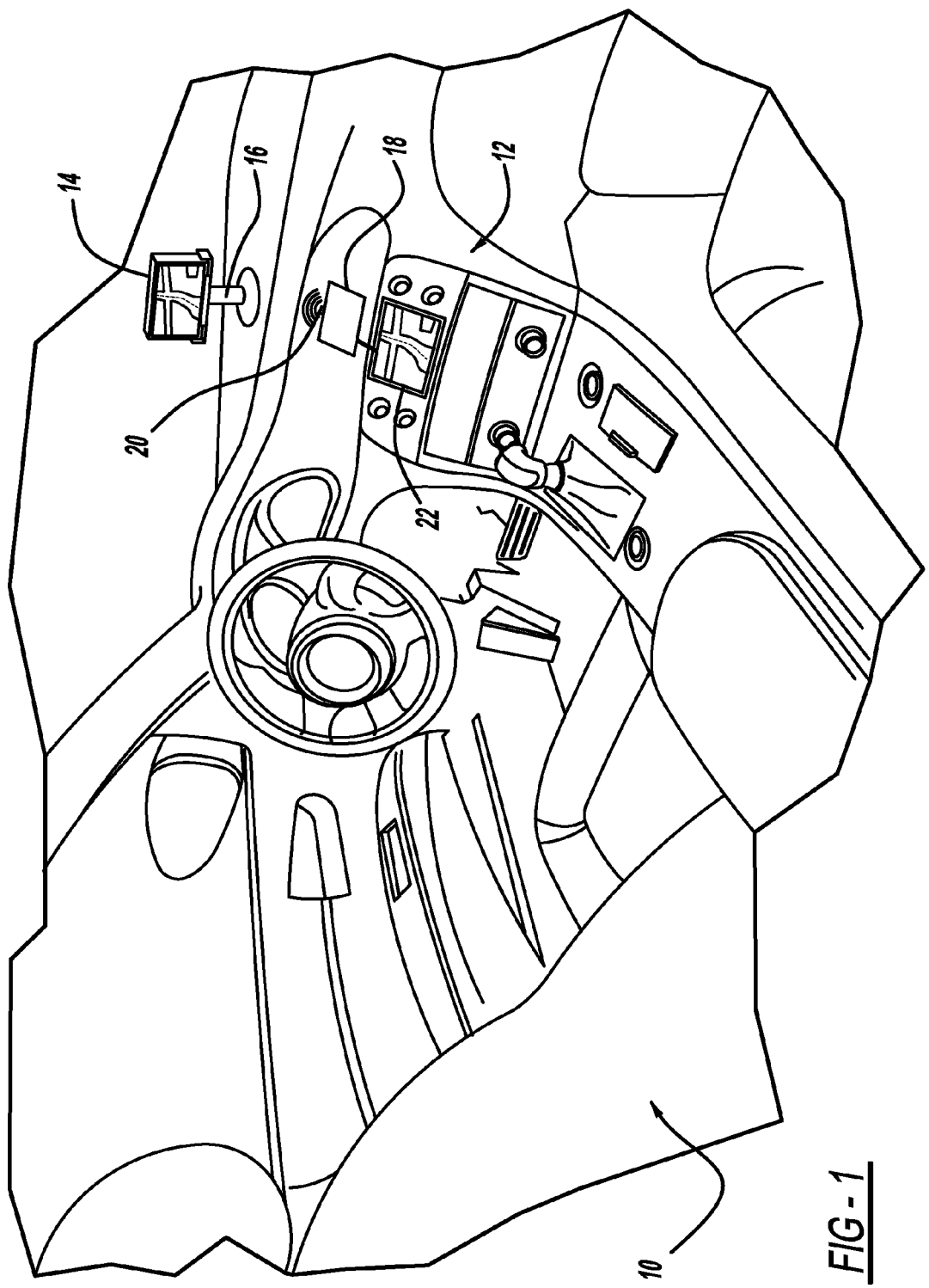
FIG. 1 is a partial interior view of a vehicle showing elements of a system for integrating a camera-equipped mobile device with the vehicle.

FIG. 1 is a partial interior view of a vehicle 10 showing elements of a system 12 for integrating a camera-equipped mobile device 14 with the vehicle's other systems. The mobile device 14 can be any device which is equipped with a camera and capable of communicating with other devices. The mobile device 14 would most commonly be a mobile phone, which could range from the simplest camera-equipped cell phone to the most sophisticated application-laden personal productivity device. The mobile device 14 is placed in a mounting fixture 16, which at a minimum holds the mobile device 14 in a fixed location. Additional features can be provided by the system 12 if the mounting fixture 16 has the ability to rotate about one or more axes, to aim the camera in the mobile device 14 in a preferred direction based on the driving situation, and adjust the camera's aim to compensate for vehicle motion. This will be discussed in detail below. The mounting fixture 16 can also provide power to the mobile device 14 through an integrated wire and plug, so that the device 14 does not have to run on battery power alone when being used in the vehicle 10.

A processor 18 in the vehicle 10 performs several functions, including communicating with the mobile device 14 via a communication link 20, described below. One specific function of the processor 18 is to control the operation of the camera in the mobile device 14. This can include controlling the aiming direction of the mobile device 14 by rotating the mounting fixture 16. The processor 18 can also issue commands to the mobile device 14 regarding operation of the camera, such as a zoom in or zoom out command, a command to capture and transfer one or more still images, or a command to stream video images.

The processor 18 can also provide data to the mobile device 14, which the device 14 can use in its applications. Data which could be provided by the processor 18 to the mobile device 14 includes any data which exists on the vehicle bus, such as vehicle speed, transmission selection (forward or reverse), vehicle heading direction, and so forth. The processor 18 can also provide to the mobile device 14 any parameter or data value which is known to the processor 18, from any system hosted by the processor 18 or another processor onboard the vehicle 10. Many different types of parameter and data values from the vehicle 10 could be used by the mobile device 14 to improve the robustness of applications running on the mobile device 14.

In addition to communicating with the mobile device 14, the processor 18 can also host other vehicle systems, such as safety systems, navigation systems, communication systems, and information and entertainment systems. These other vehicle systems could also be hosted on other processors (not shown) onboard the vehicle 10, with the processor 18 being in two-way communication with the other processors. The vehicle systems mentioned, whether hosted on the processor 18 or on other processors, can benefit from receiving camera image data from the mobile device 14. By virtue of its hosting of, or interface with, numerous onboard vehicle systems, the processor 18 can also activate various alerts and alarms, such as those that would be issued by a lane departure warning system or a driver drowsiness detection system. The processor 18 can also control the display of information and images on a display unit 22, described below. In summary, the processor 18 hosts or interfaces with numerous vehicle systems, and controls their interaction with the mobile device 14 and its camera.

The communication link 20 enables two-way communication between the mobile device 14 and the processor 18. The communication link 20 can be embodied as either a wireless channel or a hard-wired connection. In the case of a hard-wired connection, the communication link 20 can typically share the same wire and plug used for providing power through the mounting fixture 16 to the mobile device 14. Where the communication link 20 is to be embodied as a wireless channel, standard protocols such as Bluetooth and Wi-Fi can conveniently be used, as they are commonly supported by both vehicle manufacturers and wireless device manufacturers. Details of a Bluetooth implementation are discussed below.

Bluetooth is an open, secure protocol for wirelessly exchanging data over short distances from fixed and mobile devices. Bluetooth uses radio frequency (RF) technology at 2.4 gigahertz or GHz ($2.4 \times 10^9$ cycle/sec), to wirelessly communicate between two or more devices, at a gross data rate of up to 1 mega-bit per second (Mb/s). Bluetooth provides a way to connect and exchange information between devices, such as mobile phones, computers, vehicle communication and entertainment systems, printers, Global Positioning System (GPS) receivers, digital cameras, and video game consoles. When a device is said to be Bluetooth enabled, it means that device includes a small computer chip that contains the Bluetooth radio and software that enables that device to connect to other devices wirelessly using Bluetooth technology.

In the case where the communication link 20 uses Bluetooth, the mobile device 14 can easily be paired to the vehicle 10, meaning that secure wireless communication has been established between the two. This pairing only needs to be done once between any particular mobile device and any particular vehicle. After that, each time the mobile device 14 is brought into the vehicle 10, Bluetooth communications are automatically established.

Various Bluetooth profiles are available for controlling still-frame and video imaging devices and sharing the images over a Bluetooth wireless channel. The Bluetooth Basic Imaging Profile (BIF) provides a protocol for allowing a device, such as the processor 18, to command another device, such as the mobile device 14, to take a still-frame picture and send the picture image back to the processor 18. Other camera control operations are also supported in the Basic Imaging Profile. The Bluetooth Video Distribution Profile (VDP) is a protocol that can similarly be used for capture and transmission of video images between the mobile device 14 and the processor 18.

The display unit 22, in communication with the processor 18, provides a visual display of images, messages, or data, as directed by the processor 18. For example, the display unit 22 could display a rearward camera image when the vehicle 10 is backing up, an augmented reality style image including navigation and point of interest data when the vehicle 10 is driving forward, and status messages at any time. This is in addition to the types of display functions normally handled by a typical display, such as the display unit 22 in the vehicle 10, including DVD video output, and audio system controls and information. Also, the display unit 22 can serve as a human-machine interface (HMI) by featuring touch screen capability, so that a user can make menu selections to control the operation of the system 12 or any other onboard systems.

Figure 2:
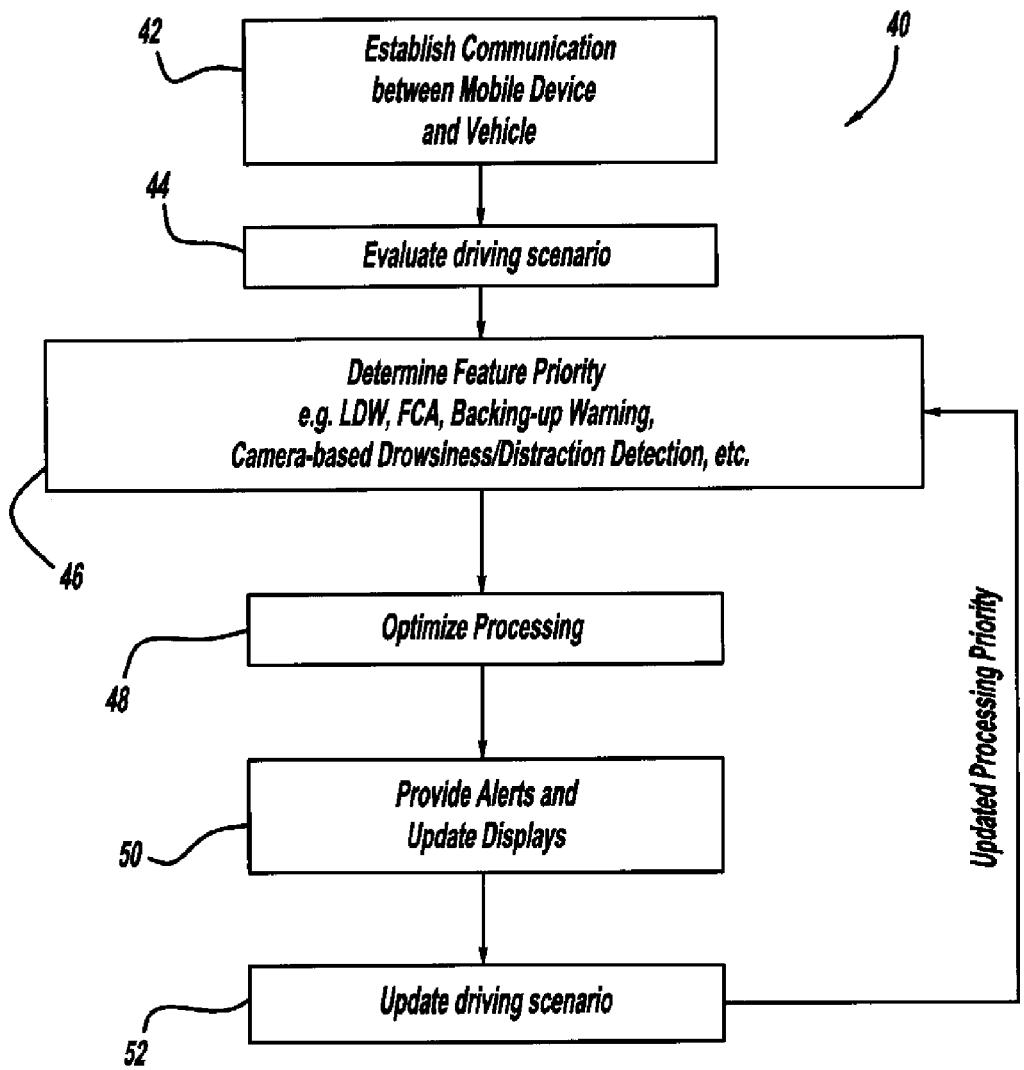
FIG. 2 is a flow chart diagram of a first process for integrating a camera-equipped mobile device with a vehicle's electronic systems.

FIG. 2 is a flow chart diagram 40 of a first process for integrating a camera-equipped mobile device, such as the mobile device 14, with a vehicle's electronic systems. At box 42, two-way communication is established between the mobile device 14 and the vehicle 10, specifically the processor 18. The communication link 20, whether hard-wired or wireless, is used to establish communication at the box 42. Henceforth in the process, images and other data are continuously communicated between the mobile device 14 and the processor 18. At box 44, the processor 18 evaluates the current driving scenario, based on images and data from the mobile device 14, and data from all other sensors and systems available on the vehicle 10. For example, the transmission selection can be evaluated to determine whether the vehicle 10 is traveling forward or backward. If the transmission is in a forward gear, then vehicle speed, handwheel angle, braking status, and other parameters may be used to determine whether the vehicle is in a low speed maneuvering environment, or a high speed freeway driving environment, or otherwise. Many different types of driving scenarios can be defined, and evaluated at the box 44 based on available data about the vehicle 10 and its surroundings.

At box 46, the processor 18 determines the priority of system features to be employed, based on the current driving scenario from the box 44. There may be a long list of safety and convenience system features which can be employed at some time in the driving cycle of the vehicle 10, but only a small number of them may be relevant at any particular time under any particular driving scenario. For example, available system features may include; lane departure warning (LDW), forward collision avoidance (FCA), driver attentiveness alert, navigation assistance, traffic light state determination, and others. At the box 46, the processor 18 determines which of the available system features should be active, and also determines the priority which should be assigned to each active feature, based on the current driving scenario. For example, if the vehicle 10 is backing up, the backup assistance and warning system may be the only one which is active, and it would of course receive the highest priority. On the other hand, if the vehicle 10 is driving at highway speed, several systems may be active, such as lane departure warning, forward collision avoidance, driver attentiveness alert, and navigation assistance. In a situation like this, it is helpful to have a priority assigned to each active system feature, so that processing power and other resources can be managed optimally.

Criteria can be defined for assigning feature priority, and the processor 18 can be configured to use these criteria. The criteria could, for example, designate that safety-related system features always get higher priority than convenience systems. Also, at the box 46, the concept of a saliency map is introduced, where the saliency map is used to determine feature priority. The saliency map determines the most relevant or significant factors in the current operating environment of the vehicle 10, and assigns feature priority based on this. In the example where the vehicle 10 is driving at highway speed, lane departure warning and forward collision avoidance may have the highest priority based on pre-programmed criteria. But the saliency map could be used to give forward collision avoidance top priority if, for example, a potential obstacle is detected in the path of the vehicle 10. In this way, the processor 18 can dynamically assign feature priority at the box 46.

At box 48, processing is optimized based on the feature priority assigned at the box 46. Optimizing processing at the box 48 includes both determining what to compute, as determined by the feature priority defined at the box 46, and also how to balance computations between the processor 18 and the internal processor in the mobile device 14. Many modern mobile phones and personal productivity devices include a fairly high performance internal processor. It is possible for the vehicle's processor 18 to know what kind of processor is available in the mobile device 14, and also to know what applications are available on the mobile device 14. With this information, the processor 18 can determine what computing tasks should be undertaken by the processor 18 and the mobile device 14, and what priority should be assigned to each task. For example, if the mobile device 14 is a high-end personal productivity device, it may include an advanced navigation assistance application and even a lane departure warning. Knowing this, the processor 18 can instruct the mobile device 14 to give high computational priority to the lane departure warning feature, and medium priority to the navigation assistance application, while the processor 18 itself gives top priority to forward collision avoidance. This is just one simple example of how computational processing can be balanced and optimized at the box 48.

It is also possible at the box 48 to offload or distribute computational tasks from the mobile device 14 to the processor 18. At some times, the applications residing on the processor 18 may not create very much computational load. At these times, the processor 18 can take on computational workload from the mobile device 14. The reverse is also true—that is, the mobile device 14 may be able to take on computational tasks from the processor 18 under certain circumstances. This balancing and distribution of computational load is all handled at the box 48.

At box 50, the outputs of the active system features are provided. This includes audible and visual alerts that may need to be issued by safety related systems, information displayed on the display unit 22 or the mobile device 14, and even vehicle interventions such as braking or steering to avoid a collision. In reality, the process shown on the flow chart diagram 40 loops at a very high rate of speed, so the alerts and displays are updated at the box 50 essentially in real time, that is, at least several times per second.

At box 52, the driving scenario, which was initially evaluated at the box 44, is updated based on the latest information. The process then loops back to the box 46, where the priority of system features is again determined, and so forth.

Figure 3:
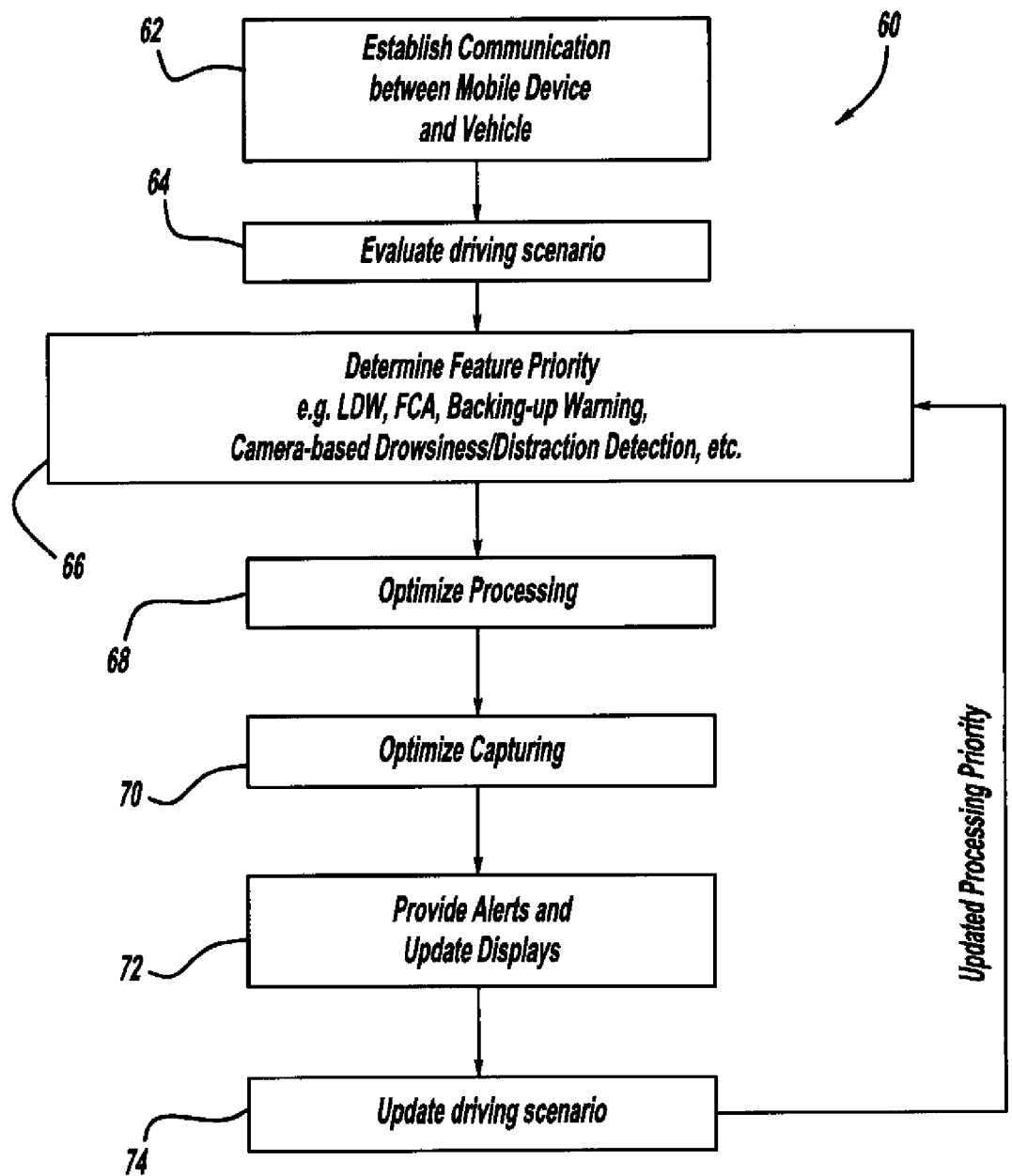
FIG. 3 is a flow chart diagram of a second process for integrating a camera-equipped mobile device with a vehicle's electronic systems.

FIG. 3 is a flow chart diagram 60 of a second process for integrating a camera-equipped mobile device, such as the mobile device 14, with a vehicle's electronic systems. The process begins with establishing communications at box 62, evaluating the driving scenario at box 64, and determining feature priority at box 66. These steps are the same as described at the boxes 42, 44, and 46, respectively, of the flow chart diagram 40.

At box 68, processing is optimized based on the feature priority assigned at the box 66. This activity is the same as described for the box 48 of the flow chart diagram 40. At box 70, capturing of images and other data is also optimized based on the feature priority assigned at the box 66. As described previously, the mobile device 14 is assumed to include a camera for capturing still-frame and/or video images. The vehicle 10 may or may not also have a camera, and in fact, may have more than one camera, such as a forward-looking camera, a rearward-looking camera, and/or a driver-focused camera. At the box 70, camera field of view (aim and zoom), focus, calibration, and other parameters are all adjusted to optimize image capturing.

At the box 70, with the information about what cameras are onboard and the feature priority from the box 66, the processor 18 can determine what images should be captured by each camera, and how to use the images in feature computations which are currently being performed. In addition, the processor 18 can command the mounting fixture 16 to rotate so as to aim the camera in the mobile device 14 in a particular direction. For example, in a situation where the vehicle 10 includes no cameras of its own, at the box 70 the processor 18 may determine that the camera in the mobile device 14 should be aimed forward for normal driving, with slight rotations to the left or right to obtain better images of potential obstacles or other objects. Alternatively, if the vehicle 10 includes a forward-looking camera, then at the box 70 the processor 18 may determine that the camera in the mobile device 14 should be aimed toward the driver during highway driving, thus providing a source of image input for driver attentiveness evaluation.

Many different imaging scenarios are possible, depending on the number and type of cameras onboard, and the priority of system features which are currently active. In a situation where the vehicle 10 has one or more cameras of its own, it may be determined that the camera in the mobile device 14 should capture images which contain a similar field of view to a vehicle camera. In this situation, the two similar images could be processed in an image fusion algorithm, to provide a higher quality image data analysis, or to benefit from the stereoscopic properties of two images taken from slightly different locations.

Optimizing capturing at the box 70 can also include more than just the cameras onboard the vehicle 10 and within the mobile device 14. Other data sources could also be activated or deactivated based on the current feature priority, including a GPS unit in the mobile device 14, and a radar unit onboard the vehicle 10, if so equipped. Following the optimization of processing and capturing at the boxes 68 and 70, alerts are provided and displays are updated at box 72, and the driving scenario is updated at box 74, in the same way as these steps were done at the boxes 50 and 52, respectively, of the flow chart diagram 40.

In another embodiment of the present invention, the boxes 68 and 70 can be reversed—that is, optimizing capturing can be performed before optimizing processing. Here again, the process runs very quickly, so there would be very little time lag between the capturing at the box 70 of one loop of the process and the processing at the box 68 of the next loop. Nonetheless, it may be beneficial to place the optimize capturing step ahead of the optimize processing step in some implementations, and vice versa in other implementations.

Other interactions can occur between the mobile device 14 and the processor 18 during the processes described above. For example, the mobile device 14 could offer vehicle-related applications, such as lane departure warning, even if the vehicle 10 does not. In a situation such as this, it would be particularly helpful to provide vehicle dynamic state data and other data, such as yaw rate and steering handwheel angle, from the processor 18 to the mobile device 14. Additionally, other types of data besides image data could be provided by the mobile device 14 to the processor 18. This could include, for example, data from a GPS receiver in the mobile device 14. The mobile device 14 could even provide the graphical output of any of its applications to the processor 18 for display on the display unit 22. The mobile device 14 could also use its built-in phone capability to connect via a cellular phone call to a data source, such as a navigation service, and provide the data from the data source to the processor 18.

The embodiments described above offer a number of advantages to the vehicle manufacturer and to the consumer. The ability to share computing load between the processor 18 and the mobile device 14 allows both devices to operate more effectively, and ultimately provides more useful information to the driver of the vehicle 10. The ability to capture multiple camera images at the same time, such as a forward-looking video for augmented reality along with a driver-focused image for driver attentiveness, offers the best of both safety and convenience applications. These features can be provided at minimal added cost, as many people already have camera-equipped mobile devices, such as the mobile device 14, which can be integrated. Finally, unlike electronic systems which are built into a vehicle's infrastructure, the present invention makes it is easy to update the mobile device 14 to a newer and more capable model, as the demands of the consumer electronics market continue to make these devices more powerful and more affordable.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for integrating a mobile device with electronic systems in a vehicle, said method comprising:
    establishing communication between the mobile device and a processor in the vehicle;
    sharing data between the mobile device and the processor;
    evaluating a driving scenario based on input from a camera in the mobile device and input from sensors onboard the vehicle;
    creating a saliency map by determining a priority of features to be employed based on the driving scenario, and employing the features based on the priority saliency map, where the features to be employed include one or more of lane departure warning, collision detection warning, backup warning, driver attentiveness, navigation assistance, road geometry estimation, traffic light state determination, and augmented reality;
    optimizing processing based on the saliency map, including distributing computational tasks from the processor to the mobile device;
    providing alerts and updating a display unit in the vehicle based on information from the features being employed; and
    updating the driving scenario based on information from the features being employed.

2. The method of claim 1 wherein optimizing processing includes distributing computational tasks from the mobile device to the processor.

3. The method of claim 1 wherein establishing communication between the mobile device and the processor uses a wireless communication protocol.

4. The method of claim 1 further comprising optimizing capturing of images and data based on the features being employed.

5. The method of claim 4 wherein optimizing capturing of images and data includes designating images to capture by the camera in the mobile device and, if one or more cameras in the vehicle are available, designating images to use from the cameras in the vehicle, based on the features being employed.

6. The method of claim 4 wherein optimizing capturing of images and data includes adjusting an aiming direction and a field of view of the camera in the mobile device based on the features being employed.

7. The method of claim 1 wherein sharing data between the mobile device and the processor includes using the mobile device to connect via a cellular phone call to a data source, and providing data from the data source to the processor.

8. A method for integrating a mobile device with electronic systems in a vehicle, said method comprising:
    establishing communication between the mobile device and a processor in the vehicle using a wireless communication protocol;
    sharing data between the mobile device and the processor;
    evaluating a driving scenario based on input from a camera in the mobile device and input from sensors onboard the vehicle;
    determining a priority of features to be employed based on the driving scenario, and employing the features based on the priority, where the features to be employed include one or more of lane departure warning, collision detection warning, backup warning, driver attentiveness, navigation assistance, road geometry estimation, traffic light state determination, and augmented reality;
    optimizing processing based on the features being employed;
    optimizing capturing of images and data based on the features being employed, including automatically adjusting, using a mounting fixture controlled by the processor, an aiming direction and a field of view of the camera in the mobile device based on the features being employed;

providing alerts and updating a display unit in the vehicle based on information from the features being employed; and updating the driving scenario based on information from the features being employed.

9. The method of claim 8 wherein optimizing processing includes distributing computational tasks from the processor to the mobile device.

10. The method of claim 8 wherein optimizing processing includes distributing computational tasks from the mobile device to the processor.

11. The method of claim 8 wherein optimizing capturing of images and data includes designating images to capture by the camera in the mobile device and, if one or more cameras in the vehicle are available, designating images to use from the cameras in the vehicle, based on the features being employed.

12. An integrated electronic system for a vehicle, said integrated electronic system comprising:
a mobile device including a camera;
a mounting fixture for mounting the mobile device in the vehicle;
a display unit in the vehicle;
a processor in the vehicle, said processor being configured to receive image data from the camera in the mobile device, evaluate a driving scenario, create a saliency map by determining a priority of features to be employed based on the driving scenario, employ the features based on the saliency map, where the features to be employed include one or more of lane departure warning, collision detection warning, backup warning, driver attentiveness, navigation assistance, road geometry estimation, traffic light state determination, and augmented reality, optimize image capturing and processing, provide alerts, and update the display unit, said processor also being configured to control the mounting fixture to adjust an aiming position of the camera in the mobile device based on the driving scenario; and
a communication link between the mobile device and the processor for sharing images and data between the mobile device and the processor.

13. The integrated electronic system of claim 12 wherein the mobile device is configured to receive data from the processor.

14. The integrated electronic system of claim 12 wherein the communication link uses a wireless communication protocol.

15. The integrated electronic system of claim 12 wherein the processor optimizes image capturing and processing on both the mobile device and the vehicle.

16. The integrated electronic system of claim 12 wherein the processor performs computational tasks for the mobile device, and the mobile device performs computational tasks for the processor.

* * * * *